Patented July 25, 1933

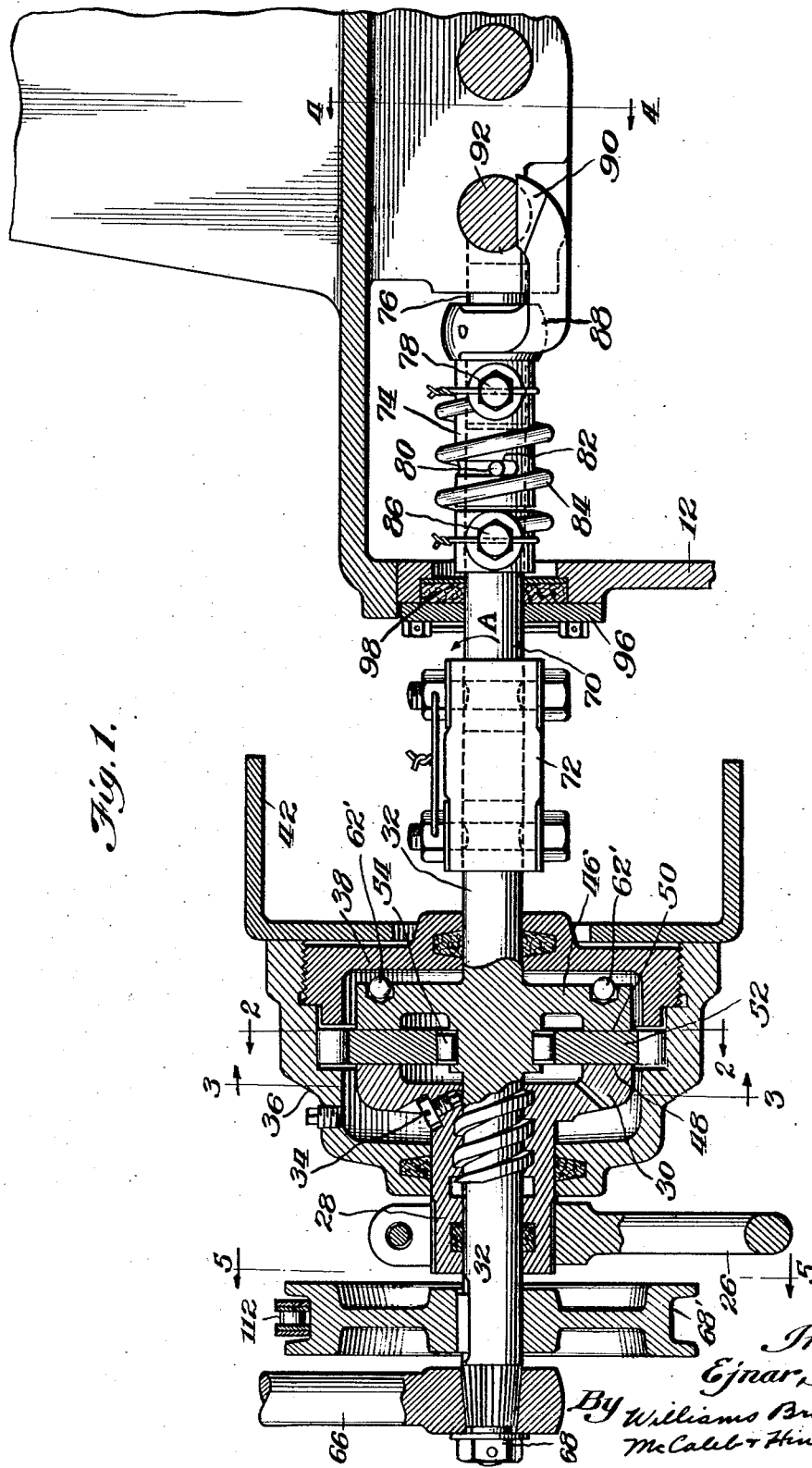

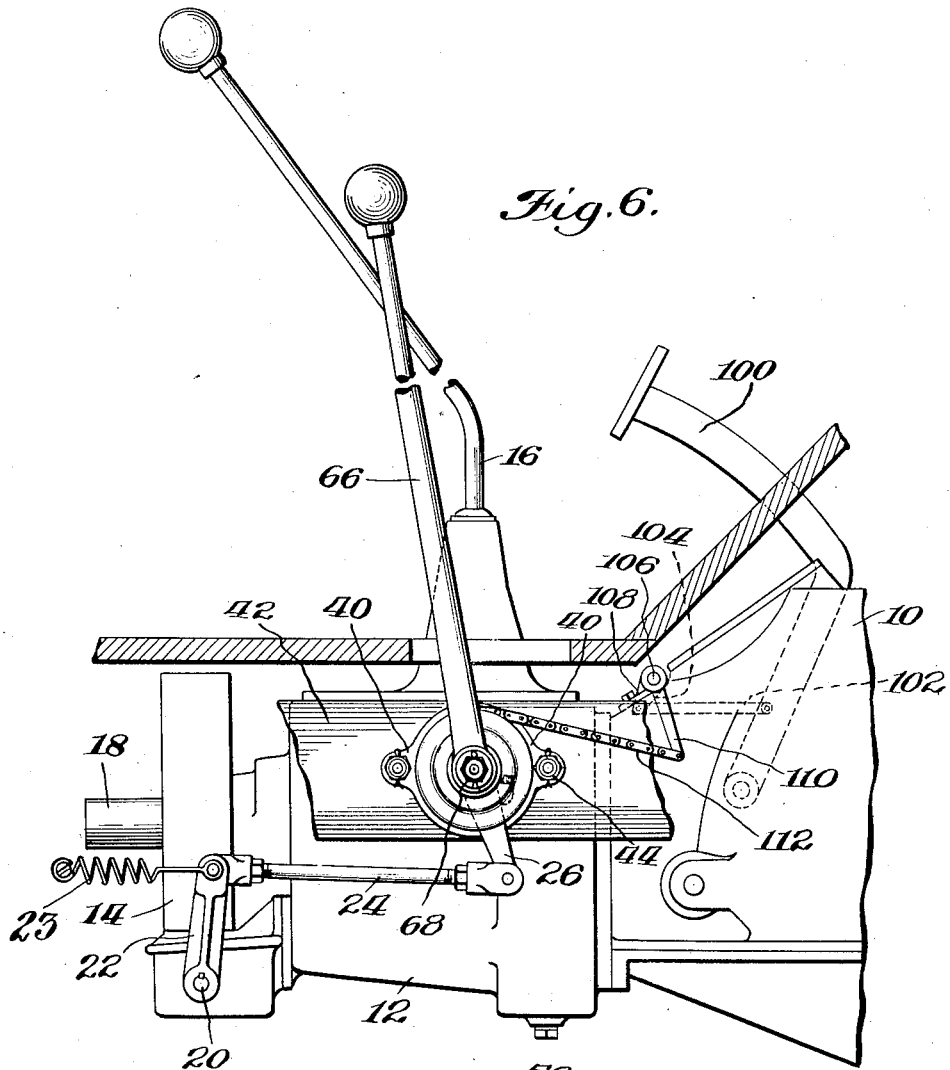
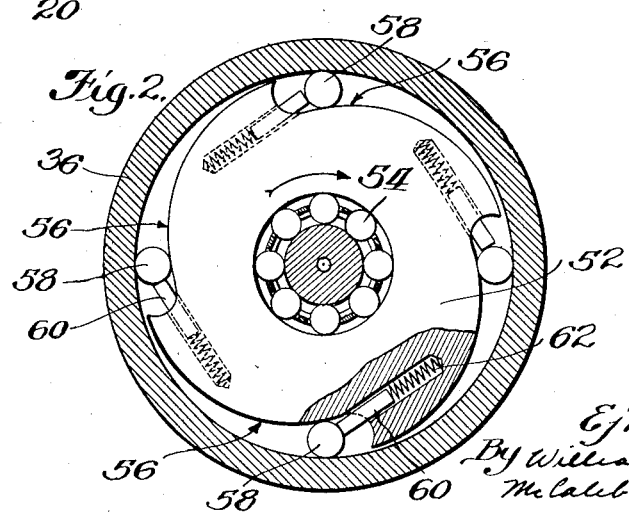

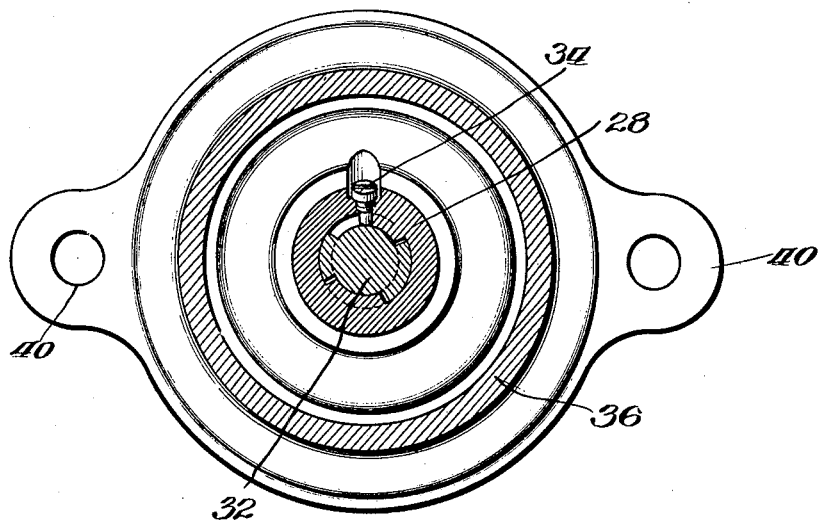
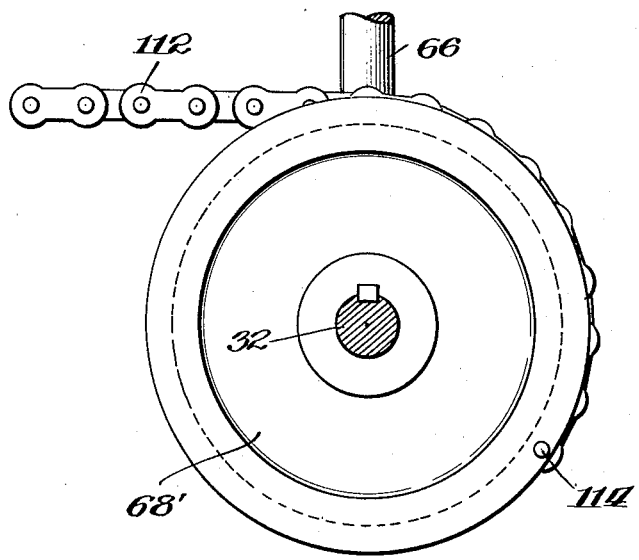
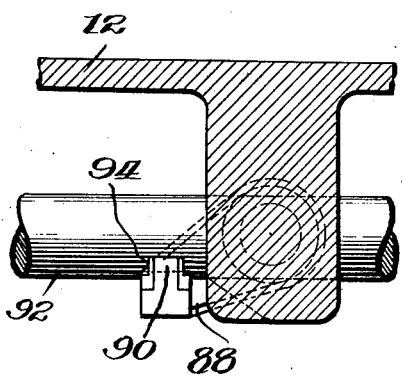

1,919,754

UNITED STATES PATENT OFFICE

EJNAR SEJERSEN, OF OAK PARK, ILLINOIS

EMERGENCY BRAKE CONTROL MECHANISM

Application filed April 12, 1929. Serial No. 354,487.

My invention relates generally to control mechanism for the emergency brake of an automotive vehicle and more particularly to means for eliminating the usual pawl and ratchet mechanism for holding the emergency brake lever in applied position and to means for automatically releasing the emergency brake and restoring the brake operating lever to normal position upon depression of the clutch pedal of the vehicle.

It is an object of my invention to provide an emergency brake operating mechanism in which it is unnecessary to disengage a pawl from a ratchet in order to release the brake.

It is a further object to provide means for releasing the emergency brake automatically upon depression of the clutch pedal.

It is a further object to provide means for preventing the shifting of the gears from neutral when the emergency brake is applied.

It is a further object to provide a simple mechanism of the above described type which will be positive in operation, durable in construction and which may be readily manufactured and installed.

Other objects will appear from the following description, reference being had to the accompanying drawings, in which Fig. 1 is a vertical sectional view of the device of my invention showing its connection with the transmission of an automotive vehicle;

Fig. 2 is a vertical section taken on the line 2—2 of Fig. 1;

Fig. 3 is a vertical section taken on the line 3—3 of Fig. 1;

Fig. 4 is a detailed sectional view taken on the line 4—4 of Fig. 1;

Fig. 5 is a section taken on the line 5—5 of Fig. 1; and

Fig. 6 is a right side elevation of my invention applied to an automotive vehicle.

The emergency brake control mechanisms at present generally used on automotive vehicles comprise a brake lever having a manually releasable pawl engaging a stationary ratchet segment to hold the lever in set position. When the emergency brake is tightly applied this pawl frequently becomes very tightly wedged between the teeth of the ratchet segment so that it is difficult for women drivers to release it. Furthermore, due to the spacing of the teeth on the ratchet segment, it is impossible in some instances to apply the brake with as much force as is desired since the pawl just misses slipping over the last tooth of the segment.

With the controls now in general use, inexperienced or careless drivers frequently forget to release the emergency brake prior to starting the vehicle, thus often burning out the emergency brake lining. I have provided two optionally usable means for preventing the driver from starting the vehicle with the brake applied. One of these means is controlled by the operation of the clutch pedal and the other comprises a lock which prevents shifting of the gears from neutral position to "low" or to "reverse" when the emergency brake is applied.

In Fig. 6 I have illustrated my invention as applied to an automotive vehicle which comprises generally an engine casing 10, a transmission casing 12, an emergency brake housing 14, and a gear shift lever 16. The emergency brake within the housing 14 acts upon the propeller shaft 18 and is applied by clockwise rotation of the shaft 20, to the outer end of which an arm 22 is secured.

The arm 22 is pivotally connected to one end of an adjustable pull rod 24, the other end of which is adjustably and pivotally secured to the end of an arm 26. The arm 26 is rigidly clamped to the hub 28 (Fig. 1) of a clutch plate 30. The hub 28 is internally threaded so as to receive a threaded shaft 32. Leftward movement of the hub 28 relative to the shaft 32 (Fig. 1) is limited by a cap screw 34 threaded in the hub and having its end adapted to engage the end of the thread formed on the shaft 32. The hub 28 and the shaft 32 are journalled in a two piece housing formed by a member 36 and a cover plate 38, the latter being threadedly secured to the former.

The member 36 has suitable sidewardly extending flanges 40 through which the housing is secured to a longitudinal reinforcing channel 42 by bolts 44. Secured to or formed integral with (as shown) the shaft 32 is a second clutch plate 46. The clutch plates 30 and 46 have opposed surfaces 48 and 50 which are adapted to make frictional contact with a friction plate 52. The latter plate is mounted for free rotation upon the shaft 32, antifriction rollers 54 being provided to facilitate such free rotation.

The plate 52 has a plurality of long tapering notches 56 formed in its peripheral edge. A roller 58 is normally projected toward the narrower portion of each of these notches by a plunger 60 normally forced outwardly by a spring 62.

The rollers 58 are thus normally held in engagement with the inner wall of the housing member 36 and the peripheral edge of the plate 52. These rollers thus form a lock to prevent counterclockwise rotation (Fig. 2) of the plate 52 relative to the housing member 36. Clockwise movement of the plate 52 is permitted by these rollers since upon initial clockwise movement of the plate the rollers will be forced into the large ends of the slots against the pressure of their springs 62, in which position they no longer form a frictional wedge between the plate 52 and the housing member 36.

Ball bearings 62' may be provided in the rear face of the clutch plate 46 so as to prevent this plate from locking against the cover plate 38. The emergency brake lever 66 is rigidly secured over the tapered end of the shaft 32, being held in place by a nut 68 threaded on the shaft. A sheave 68' is keyed to the shaft 32 between the emergency brake lever 66 and the brake actuating arm 26.

A stub shaft 70 is secured to the inner end of the shaft 32 by a suitable flexible coupling 72. The right-hand end (Fig. 1) of the shaft 70 projects into a sleeve 74 which is rigidly secured to a short shaft 76 by a bolt 78. A pin 80 is secured in the end of the shaft 70 and projects through a slot 82 formed in the sleeve 74. A torsion spring 84 has one end secured to the bolt 78 and the other end secured to a bolt 86 which passes through the shaft 70. A latch 88 is rigidly secured to or formed intgrally with the shaft 76. This latch has a tooth 90 which is normally forced upwardly against the shaft 92. This shaft forms a part of the gear shifting mechanism and has a notch 94 which, when the gears are in neutral, lies above the tooth 90 of the latch 88. Since the spring 84 tends to rotate the shaft 76 so as to force the tooth 90 of the latch 88 against the shaft 92, the tooth of the latch will engage the notch in the shaft 92 and prevent shifting movement thereof under certain conditions as will hereinafter appear.

The shaft 70 is guided in a plate 96 secured to the transmission casing 12, a suitable packing 98 being provided to prevent drainage of lubricant from said casing around said shaft. The clutch pedal 100 is connected by a link 102 to an arm 104 which is rigidly secured to a shaft 106 which is journalled in a suitable bearing 108 secured to the casing 10.

An arm 110 is secured to the shaft 106 in alignment with the sheave 68' and is connected to said sheave by a chain 112, the end of said chain being secured to said sheave by a pin 114.

In operation, the driver merely pulls the emergency brake lever rearwardly until the brakes are applied with sufficient pressure. Counterclockwise movement (Fig. 6) of the shaft 32, to which the lever 66 is rigidly secured, causes the clutch plate 30 to move against the friction plate 52 due to the interaction of the threads on the shaft 32 with the threaded hub 28 of the clutch plate. The friction plate 52 is thus frictionally engaged between the two clutch plates 30 and 46 and forms a frictional connection between the plates, thereby causing the arm 26 to be moved with the lever 66. The plate 52 may rotate counterclockwise, Fig. 6, or clockwise as shown in Fig. 2, but as soon as rotation of the plate ceases the plate will be locked against movement in the opposite direction by the rollers 58.

When it is desired to release the brakes it is necessary merely to push the lever 66 forwardly. During the initial portion of this forward movement the clutch plate 30 will be moved out of contact with the plate 52 due to the interaction of the threaded portion of the shaft 32 with the hub 28, thereby permitting the arm 26 to swing clockwise (Fig. 6) through an angle corresponding to the angle through which the lever 66 has been moved.

It will be understood that the emergency brake mechanism within the housing 14 has suitable resilient means which will tend at all times to release the brake and to swing the arm 22 counterclockwise (Fig. 6). Such means are diagrammatically illustrated as a tension coil spring 23.

Assuming that the gear shift lever has been shifted to neutral before applying the emergency brake, a rearward pull on the lever 66 will cause the shaft 70 to rotate in the direction indicated by the arrow A in Fig. 1, thus tensioning the spring 84 and moving the pin 80 in the slot 82. The sleeve 74, shaft 76 and hence the latch 88, will thus be driven through the spring 84 in the direction of the arrow A so as to cause the tooth 90 to register in the notch 94. If the gear shift lever is not in neutral position when the emergency brake lever is applied, the spring 84 will permit the shaft 70 to rotate and will force the latch 88 against the shaft 92 so that if thereafter the gear shift lever is shifted to neutral position, the latch tooth 90 will snap into the notch 94 because of the tension of the spring 84.

Upon releasing the brake the shafts 32 and 70 are moved in a direction opposite to the arrow A. During this movement the pin 80 will engage with the end of the slot 82 and swing the tooth 90 of the latch 88 out of the notch 94 and thus permit operation of the gear shift lever.

I have also provided means which may optionally be used to release the emergency brake. By depression of the clutch pedal 100 the shaft 106 is rotated counterclockwise (Fig. 6) and exerts a pull upon the chain 112. This pull on the chain 112 rotates the shaft 32 in a direction opposite to the arrow A and thereby has the same effect as the forward push on the lever 66.

If desired, however, both the latch means for preventing shifting of the gears from neutral position when the emergency brake is applied, and the clutch pedal actuated means for releasing the emergency brake, may be used. It will be understood that other means for connecting the clutch pedal with the emergency brake lever handle may be used. Other means may be used to support the device, for example, the housing 36 may be secured directly to the transmission gear casing.

The invention is capable of wide variation within equivalent limits and I contemplate such variation as may be desirable or useful in the particular adaptation of the invention shown, or in its adaptation to other mechanisms. I do not restrict myself in any unessential particulars, but what I claim and desire to secure by Letters Patent is:

1. In an automotive vehicle, the combination of an emergency brake mechanism having spring actuated means for releasing the same, a manually operable lever for actuating said brake mechanism to apply the brake, a rotatable friction plate, a housing therefor, means to prevent rotation of said plate in one direction comprising a roller positioned between said plate and said housing, a pair of clutch plates engageable with said friction plate and connected to said mechanism and lever respectively, and a screw connection between said plates, whereby movement of said lever in one direction will cause said clutch plates to clamp against said friction plate and move therewith and movement of said lever in the opposite direction will cause said clutch plates to be moved away from said friction plate and permit free movement of the one of said clutch plates connected with said brake mechanism under the influence of its spring actuated means.

2. In an automotive vehicle, the combination of spring returned means for applying the emergency brake thereof, an emergency brake handle, a rotatable shaft operatively connected to said handle, a clutch plate movable with said shaft, screw threads on said shaft, a second clutch plate having an internally threaded hub engageable with the screw threads on said shaft, means connecting said hub with said brake applying means, a friction plate rotatably mounted on said shaft and positioned between said clutch plates, a housing surrounding said friction and clutch plates, and frictional wedging means positioned for direct engagement between said friction plate and said housing to prevent rotation of said friction plate in one direction only.

3. In an automotive vehicle, the combination of means for applying the emergency brake thereof, an emergency brake handle, a rotatable shaft operatively connected to said handle, a clutch plate movable with said shaft, screw threads on said shaft, a second clutch plate having an internally threaded hub engageable with the screw threads on said shaft, means connecting said hub with said brake applying means, a friction plate rotatably mounted on said shaft and positioned between said clutch plates, a housing surrounding said friction and clutch plates, means cooperating between said housing and said friction plate permitting movement of the latter in one direction only, a clutch controlling pedal for the automotive vehicle, and a connection between said pedal and said shaft operative to rotate the shaft upon depression of the pedal.

4. In an automotive vehicle, the combination of means for applying the emergency brake thereof, an emergency brake handle, a rotatable shaft operatively connected to said handle, a clutch plate movable with said shaft, screw threads on said shaft, a second clutch plate having an internally threaded hub engageable with the screw threads on said shaft, means connecting said hub with said brake applying means, a friction plate rotatably mounted on said shaft and positioned between said clutch plates, a housing surrounding said friction and clutch plates, means cooperating between said housing and said friction plate permitting movement of the latter in one direction only, a clutch controlling pedal for the automotive vehicle, and a lost motion connection between said pedal and said shaft whereby depression of said pedal will rotate said shaft to release said brake applying means when in applied position but will not affect said last named means when the brake is not applied.

EJNAR SEJERSEN.